Sept. 16, 1924.

W. LEATHERS

AEROPLANE

Filed Dec. 4, 1917    8 Sheets-Sheet 1

1,508,604

Sept. 16, 1924. 1,508,604
W. LEATHERS
AEROPLANE
Filed Dec. 4, 1917 8 Sheets-Sheet 2

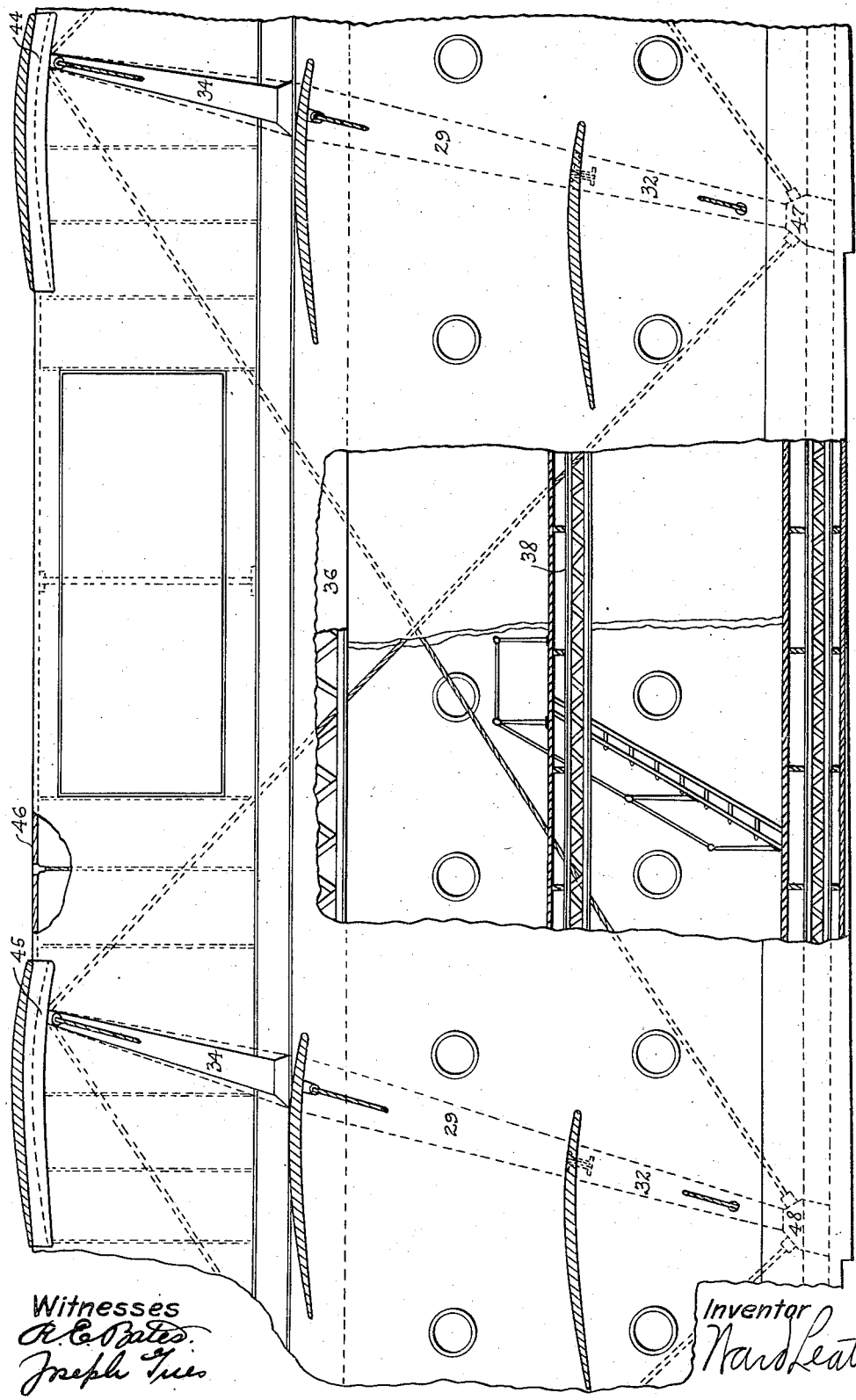

Sept. 16, 1924.

W. LEATHERS

AEROPLANE

Filed Dec. 4, 1917   8 Sheets-Sheet 5

1,508,604

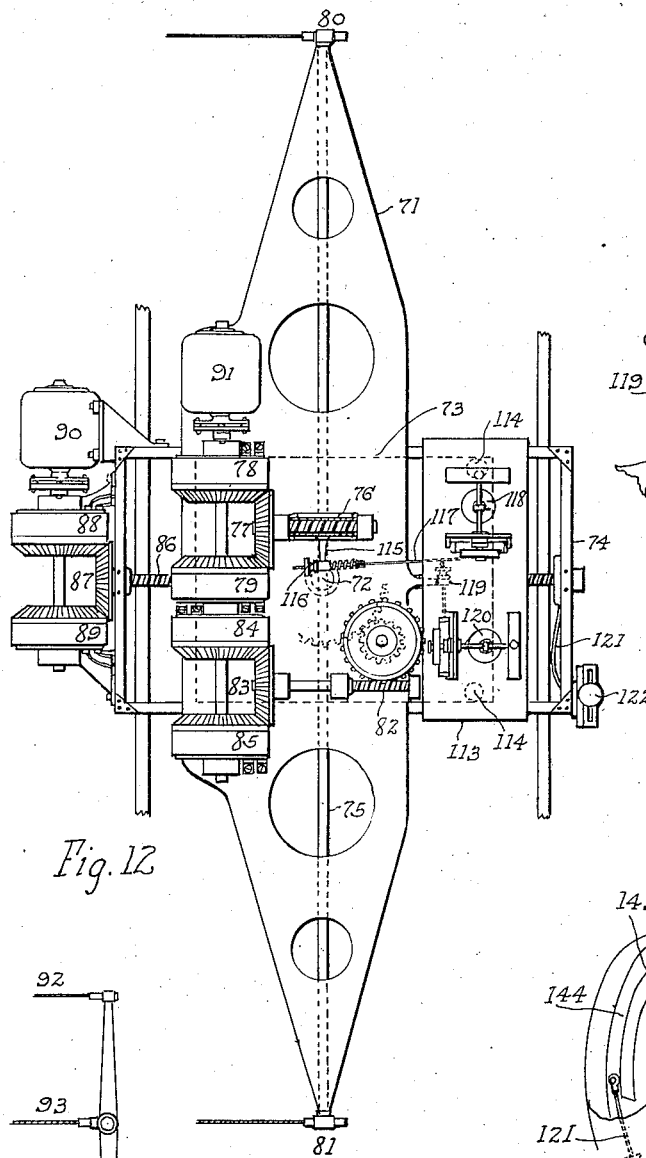
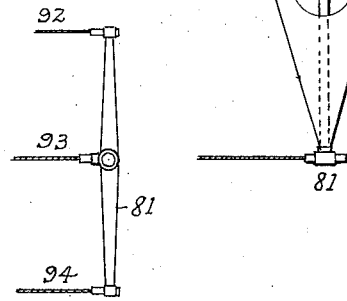
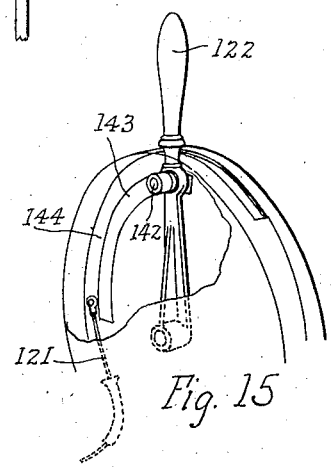

Sept. 16, 1924.                    W. LEATHERS                    1,508,604
                                    AEROPLANE
                          Filed Dec. 4, 1917        8 Sheets-Sheet 8

Patented Sept. 16, 1924.

1,508,604

UNITED STATES PATENT OFFICE.

WARD LEATHERS, OF HAWORTH, NEW JERSEY.

AEROPLANE.

Application filed December 4, 1917. Serial No. 205,341.

*To all whom it may concern:*

Be it known that I, WARD LEATHERS, of Haworth, in the county of Bergen and State of New Jersey, have invented a certain new and useful Improvement in Aeroplanes, and do hereby declare that the following is a full and exact description thereof.

My invention is for the purpose of producing an aeroplane of very large proportions capable of carrying many passengers and much mail or express or powerful ordnance and armament over great distances.

Heretofore practically all aeroplanes have been built of monoplane type, or of biplane or triplane types, with a single set of main aerofoils in superimposed order for carrying the load.

I have found that it is possible to fly with a multiplicity of aerofoils of approximately equal size in tandem arrangement substantially directly behind one another or in other words, in each other's wake, and I have discovered that efficient coefficients can be obtained by sufficient decalage between these following aerofoils to give each approximately the same relative and therefore efficient incidence to the air-stream.

I have found that approximately 3 chord lengths behind the trailing edge of any aerofoil of present-used section at 60 M. P. H. the downwardly deflected air-stream washes out approximately 25 per cent of the total downward declination. It is therefore obvious that another aerofoil of similar proportions and characteristics may follow at that distance behind the leading plane, and by increasing its angle of incidence approximately 75 per cent, the relative angle of incidence and hence the relative efficiency may be approximately maintained. If the leading aerofoil flies at an incidence of say 4° and the stream-line wash-out is 1° at the lead edge of the following aerofoil, the angle of incidence of the second aerofoil should be maintained at 7° to the line of travel and hence 4° to the wind stream to establish approximately the same L/D coefficents.

But I have discovered a further vitally important characteristic in air currents, namely—the wash-out in the stream declination decreases by a greater rate than the increase in deflection. This is due to the fact that air from the top started downward by a greater vacuum, and air from the neighborhood of the tips of the planes, rushes inward in greater degree when the deflection is greater. This natural activity may be utilized to tremendous advantage in the building of big aerial carriers by the utilization of a series of tandem planes with their incidences properly calibrated and their wing sections properly designed to take advantage of this all-important air movement. If the decalage between the leading plane and the second or following plane were 3° and it were necessary to continue the same proportionate progressive decalage from plane to plane, it would obviously be impossible to utilize more than a few tandem planes without having theoretically ridiculous incidences at the end of the series. This, however, is not the case owing to the natural law just enunciated.

In a series of tandem planes where the leading planes accomplish the desired result with an incidence of 4° and the following or second plane requires 7° to give the same efficiency, the third plane need have only such angle as 9° and the fourth such angle as 10°, the fifth such angle as 10½° and all others 10½°. These do not purport to be accurate figures since obviously a set of accurate calculations must be based upon many aerodynamic coefficients as applied to a particular machine.

For a description of my invention and the merits thereof, and also to acquire a knowledge of some of the details of construction for the purpose of accomplishing the objects above set forth, reference may be had to the following description and the accompanying drawings:

Figure 1 is a diagram representing the first three of a successive series of aerofoils following directly in each other's wake and illustrating the aerodynamic principles involved in my invention.

Fig. 2 is a diagrammatic front view and Fig. 3 a diagrammatic plan view of one of the many arrangements for my multi-tandem plane which incorporates the theoretical discoveries illustrated in Fig. 1. Fig. 4 is a lateral section of such aeroplane. Fig. 5 is a longitudinally semi-sectional view of a portion of the side of such aeroplane. Fig. 6 is an interplane strut showing single wing spar structure and means for altering incidence. Fig. 7 is a similar view showing rudder attachments. Fig. 8 is a similar view showing tubular construction. Fig. 9 shows an interplane tubular strut arrangement for double wing spar structure combined with steering rudders. Fig. 10 shows steering rudder of tubular construction used as an interplane strut. Fig. 11 shows a modification of Fig. 4 wherein a single fuselage or nacelle is used. Fig. 12, a plan view, shows a stabilizer differential; Fig. 13, an end portion thereof. Fig. 14 shows a gravity stabilizer unit with compensator and single electric contact system. Fig. 15 shows a manual control device. Fig. 16 shows a means of applying differentiated stabilizing influence to the planes. Fig. 17 illustrates the same with power applied locally. Fig. 18 is a detail of Fig. 17. Fig. 19 a modification of Fig. 18. Fig. 20 is a modification of Fig. 12.

In Fig. 1 I have illustrated diagrammatically a set of three aerofoils at A superimposed and commonly called triplane structure. Their angle of incidence to their line of travel is indicated by alpha. At B I have illustrated a similar group of triplane aerofoils following exactly in the wake of group A. At C I have illustrated another group similarly located in the wake of group B. Following C there are still other groups in similar arrangements. These aerofoils are arranged with a longitudinal gap of three chords. If the angles alpha are 4° and the windstream at the trail edge of A planes is deflected downwardly 4° and the washout at the lead edge of B planes is 1° and the angles beta are 3° and the angles gamma 4°—B planes will have theoretically the same angles of incidence to the air stream as planes A, namely 4°, and their L/D ratio should be approximately the same. The same general relationship exists between planes B and planes C. If the angles beta and gamma equal 7° and the washout at the lead edge of C planes is 2° then, with the angles delta 5° and the angles epsilon 4° the angle of incidence of C planes to the air stream will be 4° or the same as for A planes and should furnish approximately the same L/D ratio. Generally speaking, aerofoils of similar arrangement to and following C planes should follow the same law. But there are two primary reasons why the angles beta plus gamma, and delta plus epsilon, do not continue to increase progressively in the ratio indicated. The first of these reasons is the fact that the washout increases more rapidly than the progressive increase in the downward declination of the air stream, and the second is the fact that the air moves inward from areas at and even far beyond the tips of the planes to the longitudinal gap between the planes in ever increasing volume. In determining the angles of incidence for all the aerofoils in my multi-tandem-plane it is advantageous to give increasing decalage in incidence between the central portion of the plane and the tips of the plane as you advance progressively backward from A planes. The foregoing is only an elementary statement of what I have discovered to be the true aerodynamic principles involved in the construction of multi-tandem-planes of great size.

The following figures illustrate my mechanical invention, and utilize my theoretical findings. My construction enables the building of the largest, lightest, and strongest craft our building materials will permit. It overcomes the "cube-weight theory" wherever possible, and provides suitable landing, stabilizing, and controlling mechanisms for a huge aircraft. In Figs. 2 and 3, 1 and 2 are the fuselages or nacelles which house the useful load, including crew, passengers, freight, power, fuel, instruments, etc. I have found it highly desirable to use two altogether separate nacelles. I have found it equally desirable to continue them longitudinally the entire length of the craft. They are separated in order to give a landing base of sufficient lateral dimension. They are preferably continued the entire length of the craft in order to give buoyancy and hydroplane characteristics and the nacelles and pontoons are integral in order to save weight. A further reason for separating these nacelles as well as placing the motors 3, 4 and 5 in their exposed locations is to scatter the weights sidewise in order to as far as possible overcome the ancient theoretical handicap of having to "cube the weight to square the lifting surface."

The basic essential in the building of large heavier-than-air craft lies in our ability to overcome this cube-weight handicap. My craft practically completely overcomes this theory. It is accomplished in the following manner: In Fig. 2 it will be noted that the nacelle, useful load, and longitudinal structure weights are located in masses 1 and 2 and that the power weights 3, 4 and 5 are distributed at such intervals that the lateral weight distribution may be approximately even and adjustable, by altering the motor arrangement, to any desired extent. In Fig. 3 it will be noted that five sets of aerofoils following in each other's wake increase the lifting area by 5 while increasing the weight of a single unit also by 5. The net result is approximately squaring the lifting areas and squaring the weights.

In Fig. 3 the arrow shows the direction of travel of the aeroplane. 6, 7, 8, 9, 10, 11, 12, 13, 14 and 15 show hinged trailing edges for obtaining stability in the air.

Obviously this aeroplane may have any number of sets of planes depending upon lift desired, building materials and other requisites. Likewise each set may consist of any desired number of aerofoils.

The engine units as shown at 3, 4 and 5 may be distributed evenly on all sets of planes or may be alternate tractors and pushers as illustrated. The object of the tractor-pusher arrangement being to obtain as great longitudinal distances between propellers as is practicable in order to obtain the maximum of freedom from slipstream interference.

Fig. 3 further illustrates in plan view the diagonal cable bracing which gives the craft much needed longitudinal rigidity. These diagonal members may be placed where desired depending upon the design of the particular machine.

Fig. 3 further illustrates graphically the three principles of stabilization described hereinafter. When, by means of the hinged-trailing edges, aerofoils 6, 7, 8 and 9 decrease their lift and 12, 13, 14 and 15 increase their lift or vice-versa always working inversely in the same proportion, longitudinal stability may be accomplished. Similarly when 6, 8, 10, 12, 14 increase their lift while 7, 9. 11, 13, 15 decrease their lift or vice-versa working always inversely in the same proportion, lateral stability may be accomplished. When 6, 7, 8, 9, 10, 11, 12, 13, 14, 15 increase or decrease their lift all in the same proportion the total lift may be altered without interfering with the stability of the craft or with its normal horizontal flying position. Altho by the mechanism hereinafter described it is possible to incline upwardly or downwardly the longitudinal axis of the machine in flight if desired it is not the intention or expectation that my craft will be handled that way except under unusual circumstances. The normal flying position is with longitudinal axis parallel with the surface of the earth even while the machine climbs and descends.

A further point of interest in my craft illustrated better in Figs. 2 and 3 than in any other figures shown, is the longitudinal cable structure. The cables may be located at some such positions as illustrated by 16, 17, 18, 19, 20, 21, 22, 23, 24, 25, 26, 27. They have several basic advantages. They equalize, between the planes, the stresses due to drift. They equalize the propeller thrust between the planes relieving strains due to engine stoppage. They support the planes from the front of the craft relieving the necessity for the great fore and aft strengthening members now built within the planes themselves. They truss the entire structure longitudinally making tandem-multi-planes of great size structurally possible within the allowable weights. They make possible and practical the single wing spar structure hereinafter described.

Fig. 4 shows a main vertical bridge structure composed of the members 28, 29, 30, 31, 32, 33, 34 and 35. At the points 36, 37, 38, 39 are attached the main longitudinal thrust members which give the craft its longitudinal major strength. At 40 also is a longitudinal tension or tension-thrust member offset by a relatively powerful tension member. From the point 40 to point 41 is horizontally extended the pontoon section, of any desired cross-section. The enclosed portion of the nacelle is between the points 36, 37, 40 and 41 and the entire craft may be designed of such proportions that in this space we have 1, 2, 3 or 4 decks. The gasoline is carried at some such point as 42 and 43 and may be largely carried at points in the nacelle adjacent to the bases of the wings. Fuel may be drawn from upper or lower tanks in such a manner that the center of gravity may be maintained approximately fixed and the object of carrying the fuel for long journeys opposite the bases of the wings for the steam or internal combustion power plants on that particular section of the craft is to lessen the bending moment on the longitudinal members between the main lifting sections of the craft.

Fig. 4 further illustrates a discovery which I have made which is of vital importance in the construction of the big heavier-than-air craft of the future. Heretofore aeroplane designers have given the head resistance of their craft a great deal of study in order to lessen the projected area and to stream-line its shape. I also have taken advantage in my craft of all the knowledge of head resistance known to the art, but I have further found it extremely important to provide for what I please to term "vertical resistance." While it is necessary to provide for the rapid unrestricted flow of air from front to rear thru my machine it is also necessary to provide for the rapid unrestricted flow of air downward thru my machine. I have therefore made the enclosing walls of my nacelles between the points 36 and 41 and the points 37 and 40 vertical and smooth. I have also rounded the top above the tank 42 for the same reason.

Fig. 5 illustrates a side view partially cut away of nacelle 1. The main transverse bridge structures are illustrated at 34, 29, 32, the main longitudinal members at 36, 38. From the point 44 to the point 45 the tension member 46 is used as a truss member. Between the points 45 and 47 and between the points 44 and 48 diagonal tension members are used for furnishing longitudinal rigidity to the panel between points representing the maximum vertical dimension of the craft. All the longitudinal panels are trussed in similar manner in both nacelles. It will be noticed by referring to Figure 4 that these cables lie in the side wall of the nacelle between the points 18 and 40 and do not interfere with the inside carrying space. The cable 46 is naturally continued from end to end of the craft or may be carried from a keel point as at 48 to a mast top such as 44 to another mast top and again to a keel point, thus providing longitudinal flexibility if desired.

In Fig. 6, there are tubular metal or other wing spars 49, 50 and 51 about which the aerofoils 52, 53 and 54 rotate in order to alter their incidence. This single wing spar would naturally be located at the center of pressure for normal flying speed and incidence. 55 and 56 illustrate longitudinal cables between struts. 57 is an incidence strut which may perform its function for example, by a bell-crank 58 operated from a cable 59, or the usual cable method shown at 60 where the cables go over pulleys and directly into the nacelle. The number of units of this kind per aerofoil may be as many as the aeroplane design calls for. Fig. 7 illustrates essentially the same wing spar structure as Fig. 6; but further illustrates rudders 61 and 62 for lateral steering. These rudders are operated laterally by cables illustrated at 63 and 64 or by other means.

Figure 4:
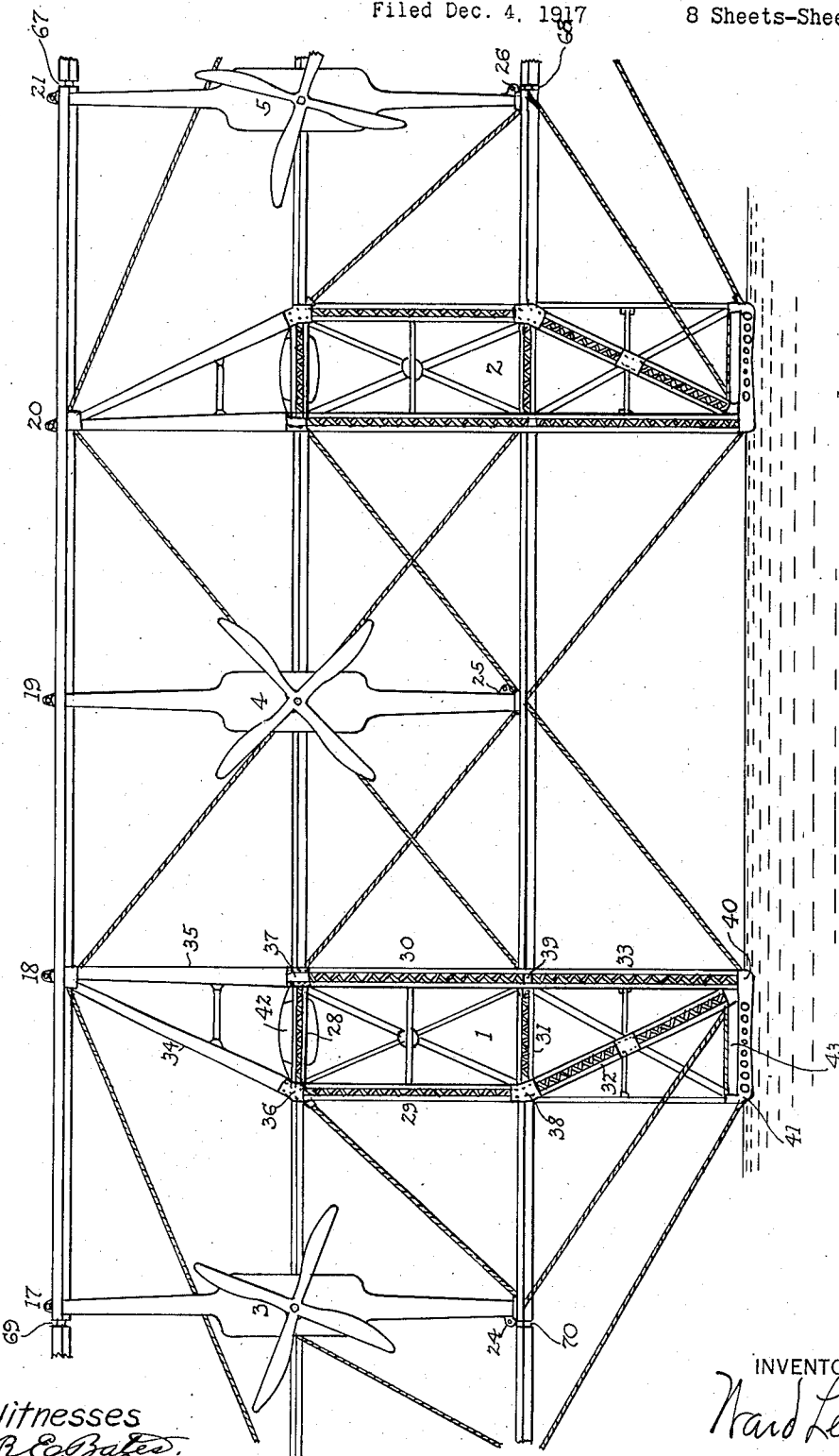
Figure 11:
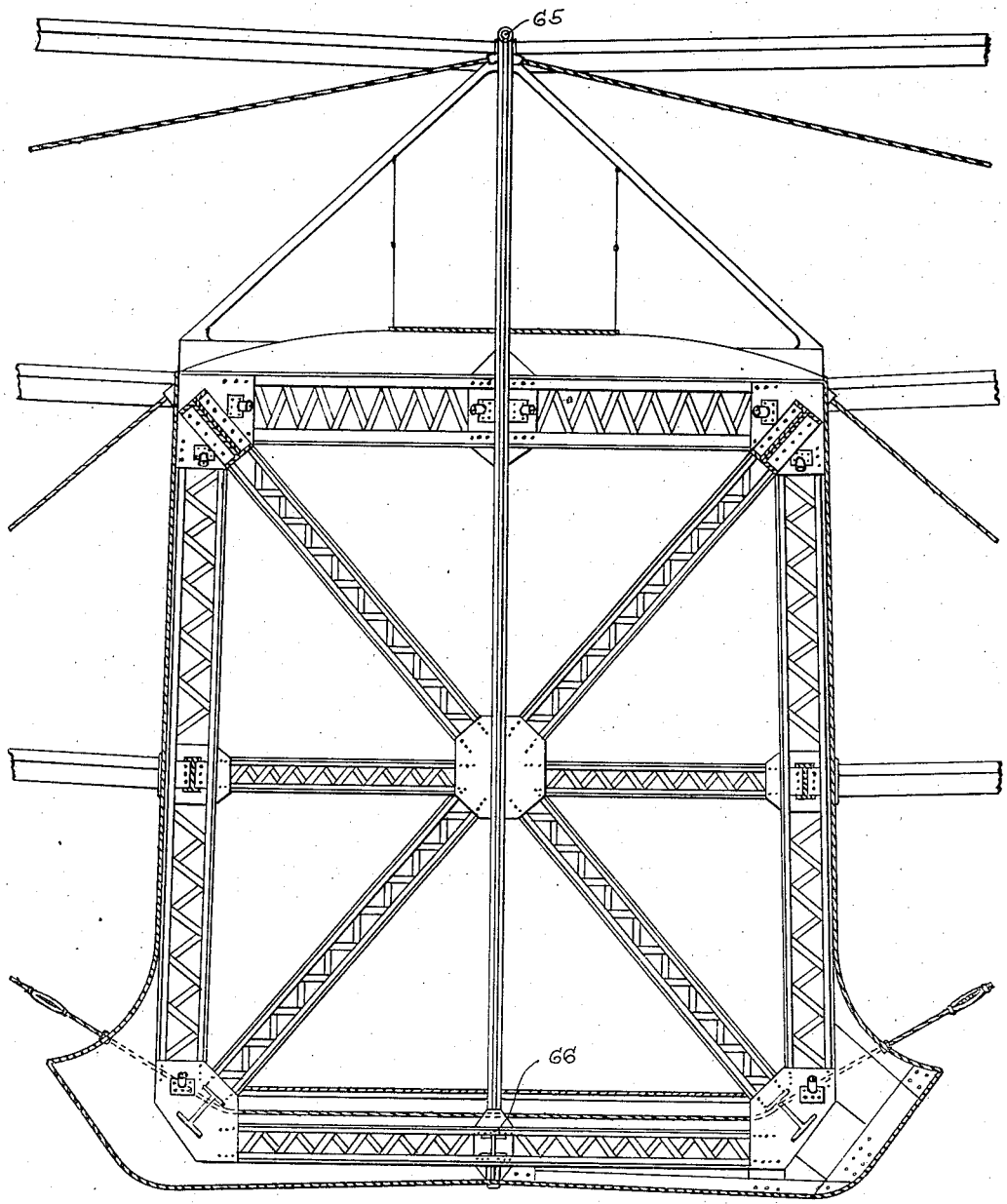

In Fig. 11 I have shown a modification of the view in Fig. 4 in which one nacelle is used and where the bottom is flared a bit for obtaining a greater base support when on the water. This nacelle like the one shown in Fig. 4 carries the same cross section practically from end to end of the craft. It is found that this structure is suitable for smaller craft. Between points 65 and 66 on succeeding bulkhead frames diagonal tension members may be used to stiffen longitudinal panels. This will bring these members or cables thru the center of the nacelle. By continuing the side members to the top plane in a suitable manner it will be possible to carry the longitudinal panel diagonal cables thru both side walls of this single nacelle system.

Figure 1:
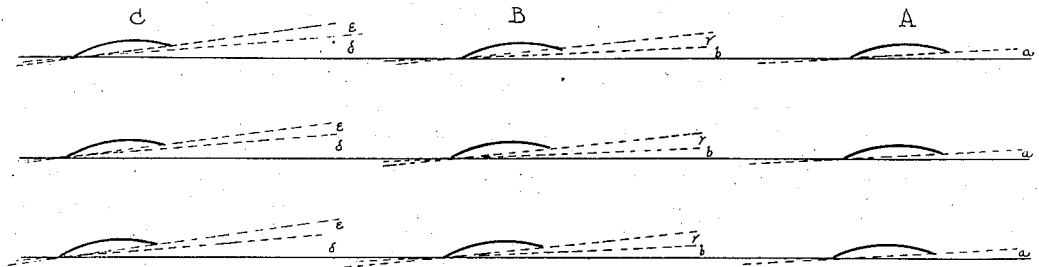
Figure 17:
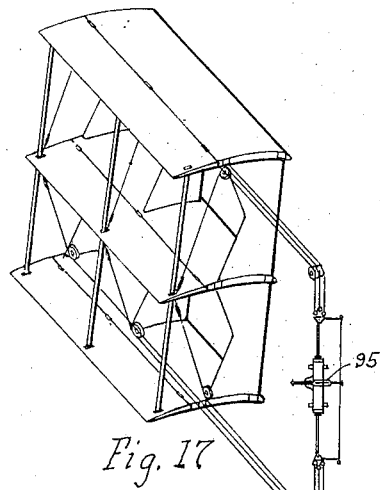
Figure 8:
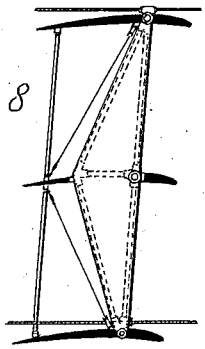
Fig. 8 shows a triangular metallic tube strut applied to my single wing spar structure permitting a change of incidence. The strut slides in a slot thru the middle plane.
Figure 9:
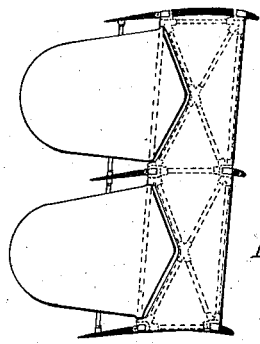
Figure 3:
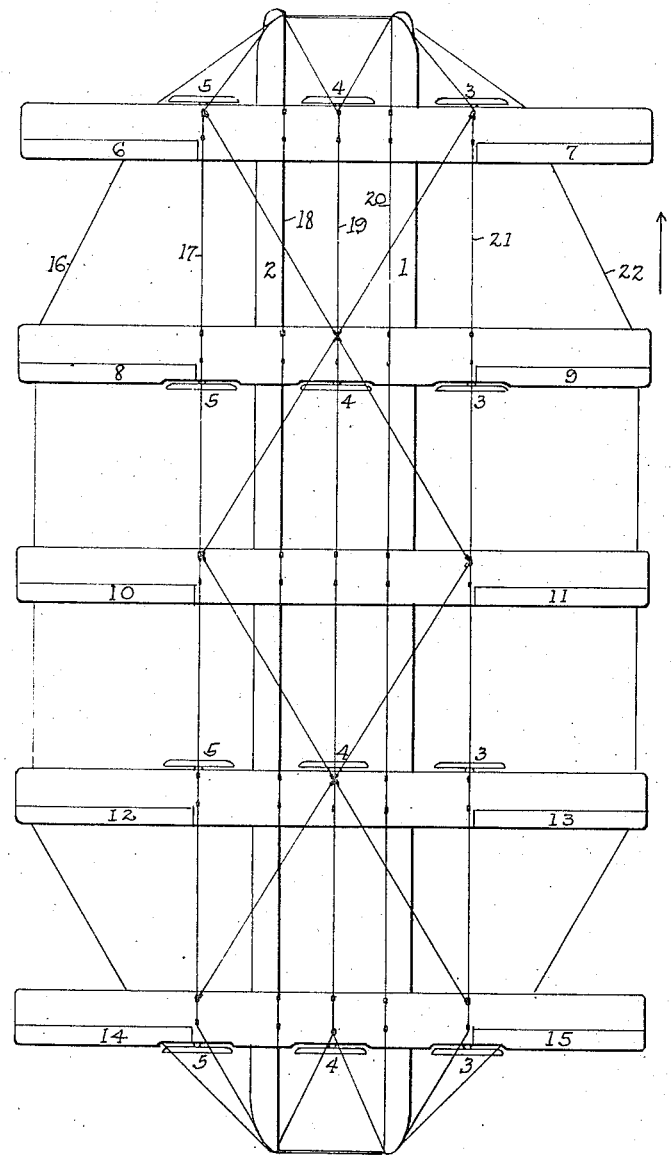

Referring to Fig. 4—from the points 67 and 68 and 69 and 70 out to the tips of the wings a change of angle of incidence is to be effected for stabilizing and control purposes, either by the use of single wing bar structure or by the use of hinged or flexible trailing edge as illustrated in Figs. 3, 9 and 17.

In order to perform the three functions of stabilization as described in Figure 3 without permitting one function to interfere with another and all three functions being obtained with the same rotating wings or flexible trailing edges it is necessary to provide a mechanism which will differentiate between the functions and actuate each set of aerofoils a correct angle with respect to the three functions and all the other planes. To accomplish this result I use what I please to term a "stabilizer differential," which I have illustrated in Figure 12 as a compound-lever-differential and in Fig. 20 a compound-gear-differential.

In Fig. 12, a plan view, the bridge 71 rotates on a pinion 72 supported by a table illustrated by the dotted line 73 which is slidably held in the frame 74. The bridge 71 carries a lateral shaft 75 driven by worm and worm gear 76, the worm being driven by a reversing gear 77, thru magnetic clutches 78 and 79 in a manner known to the art. The ends of the shaft 75 are joined to the center of lever arms 80 and 81, better illustrated in Figure 13. The bridge 71 is rotated about the pinion 72 by means of a worm and spur gear 82. The worm is driven by the reversing gear 83 thru magnetic clutches 84 and 85. The table 73 is moved fore and aft by the worm 86 driven by a reversing gear 87 thru magnetic clutches 88 and 89. The magnetic clutches 88 and 89 are constantly driven by the motor 90 and 78, 79, 84, 85 are constantly driven by the motor 91. Each of the magnetic clutches is provided with two slip rings and brushes. Turning to Figure 13 we note three cables, 92 may be connected to the forward group of right hand planes, 93 may be connected to the center right hand group of planes, 94 may be connected to the rear right hand group of planes. The three cables connected in similar manner to the arm 80 are at their other ends connected in similar manner to the three groups of left hand planes. It is now evident that as the arms 80 and 81 are turned by the shaft 75 the forward and rear groups of planes have their incidences proportionately and inversely altered thus furnishing the means of longitudinal stability. By attaching other cables to the arms 80 and 81 at points intermediate between ends and center, all planes may have an incidence change for longitudinal stabilizing functions proportionate to their distance from the longitudinal center of the craft, without interfering with their full actuation for the other two functions. When the bridge 71 turns about the center 72 the cables connected to all of the right hand planes proportionately alter the incidences of all the right hand planes while the cables connected to the arm 80 proportionately but inversely alter the incidences of all the left hand planes. This establishes the means of lateral stability. When the table 73 carries the entire bridge 71 fore and aft, it alters the angle of incidence of all the right and left hand planes proportionately and similarly. This furnishes the means of altering the total incidence or in other words varies the total lift. It is obviously possible by means of this latter function to maintain the same total engine thrust and climb or descend with only a variation in speed, making it possible to adjust the coordinates, lift, speed, and climb instantly.

Figure 16:
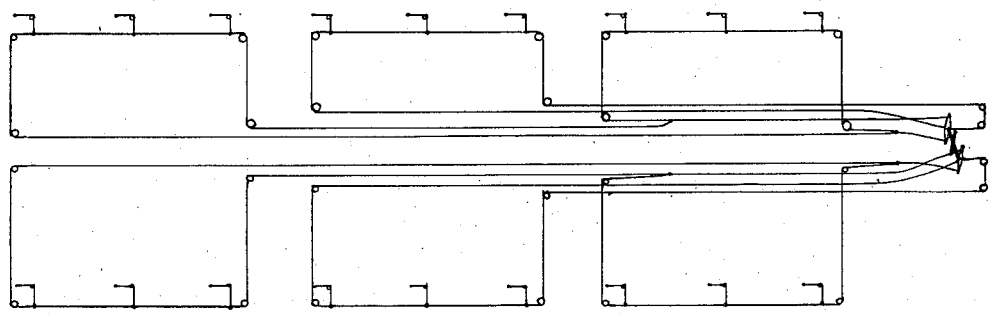

The right hand cables 92, 93, 94 and the corresponding left hand cables may be connected as illustrated in Fig. 16 for the purpose of altering the angles of incidence of the planes themselves. This plan may be found feasible with smaller ships. With larger ships it will undoubtedly be necessary and certainly far safer to apply the power necessary for altering the incidence locally and as near the planes as possible. In this case compressed air or other power might be used as illustrated in Fig. 17. The prime mover may be out between the planes themselves or immediately inside the nacelle where its operation could be under the observation of an engineer. Where the power is applied locally cables from the stabilizer differential would be connected by the group arrangement described under Fig. 12 to the follow-up valves on the prime movers as at 95, Fig. 17.

Figure 18:
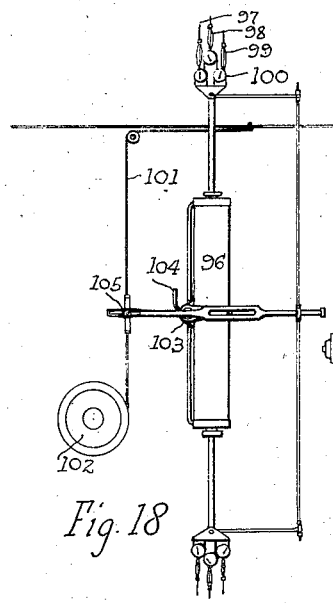

A suitable prime mover is shown more in detail in Fig. 18 where 96 is a compressed air cylinder fitted with a double acting piston to which are connected as many cables as desired leading to the trailing ailerons or to the rotating portion of the wings. In the illustration I have shown three such aileron cables at 97, 98 and 99 connected to turn buckles which are connected to tension indicators at 100. These are suitably connected to the end of the piston rod. At the other end of the piston rod a similar arrangement provides for the return cables. At 101 I have shown the cable which leads from the stabilizer differential. It is connected to a follow-up valve from which it leads to a tension device 102. The follow-up valve 103 is supplied with compressed air at 104 from any suitable source. This may be a well-known type of follow-up valve, so constructed that the piston always travels a distance thru the cylinder exactly proportionate to the distance traveled by the point 105, whereupon the valve is closed by the movement of the piston itself.

Figure 19:
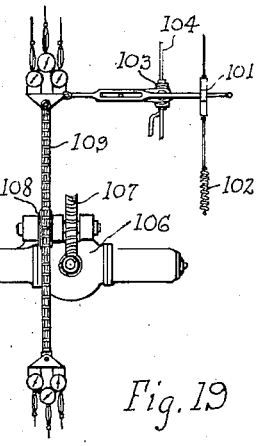
Figure 2:
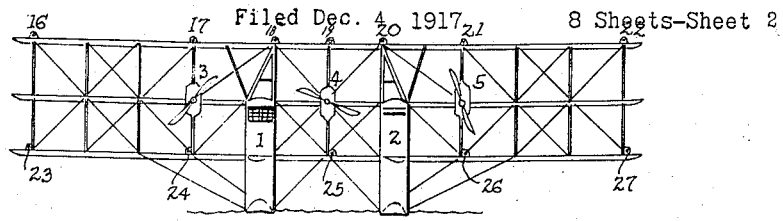

Fig. 19 illustrates a similar device for actuating the ailerons wherein a small compressed air reciprocating motor 106 is used which by means of worm gear 107 drives a sprocket 108 which drives the chain 109 which alters the angle of incidence of the planes or ailerons. 103 is the follow-up valve supplied with air at 104 and having suitable connections to the engine 106 so that the engine is operated in reverse directions in response to the valve. The valve is opened by the cable 101 and closed by the movement of the chain 109.

Figure 20:
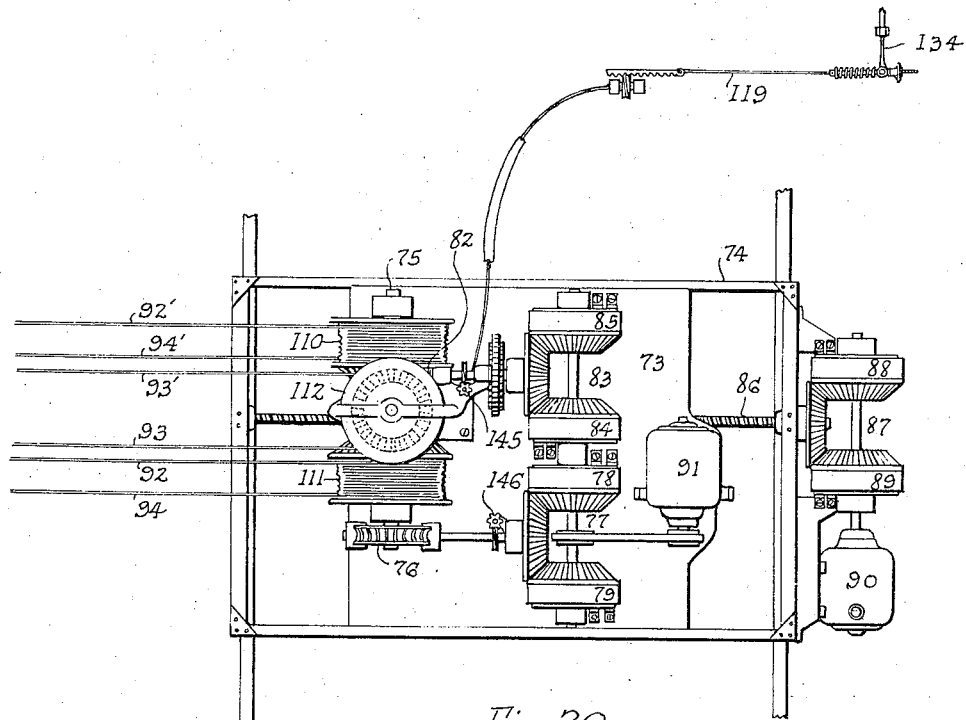

Fig. 20 is a modification of the stabilizer differential shown in Fig. 12; herein a table 73 slides in a frame 74 by similar mechanism shown in Fig. 12. At 110, 111, and 112 I have shown three drums to which are attached the cables 92, 93, 94, and 92', 93', and 94'. The drums 110 and 111 house gear differentials. The spur gears on their axes are fastened to the shaft 75 driven by the worm gear 76. These spur gears drive the outer housings or drums in the same direction thru the intermediate cage gears as in all differentials. The worm gear 82 drives the drum 112 which by means of bevel gear meshing the bevel gear on the cages of the two differentials drives the drums 110 and 111 in opposite directions and holds them in such differentiated relationship even tho being actuated at the same time by the worm gear 76. Cables 93 and 93' are connected to drum 112 taking and paying in the usual manner, similarly cables 92' and 94' are connected to drum 110, similarly 92 and 94 are connected to drum 111. Cable 92' may be connected by means of follow-up valves and actuating mechanisms heretofore described, or by other suitable electrical or mechanical connections to the forward left hand group of planes, 94' to the rear left hand group, 93' to the middle left hand group, 93 to the middle right hand group, 92 to the forward right hand group, 94 to the rear right hand group.

In Fig. 12, 113 is a raised platform held on the supports 114 carried by the table 73. The platform 113 carries lateral and longitudinal gravity stabilizers. At 115 there is a finger projecting upwardly and toward the point of rotation of the bridge 71 and attached to the worm gear 76 so that the adjusting nut 116 rocks fore and aft as the arms 80 and 81 rock thru their prescribed course. From the arm 115 a rod or other suitable connection 117 leads to the longitudinal stabilizer unit 118 for the purpose of breaking the actuating current when the stabilizer differential has operated a distance exactly proportionate to the angle the stabilizing pendulum makes with its normal relative position. This adjustment alters the longitudinal axis of the craft in flight. In similar manner a raised arm 119 carries the movement of the bridge 71 to the contact points on the lateral stabilizer 120. This adjustment alters the lateral axis of the craft in flight. At 121 is Bowden wire or other suitable connection which transmits in calibrated form the rotation of the worm 86, to the manual control mechanism 122 more fully illustrated in Fig. 15.

In Fig. 14, 123 is the main pendulum, 124 is a secondary pendulum, 125 is a laterally flexible support rigidly attached to the shaft 126 supported on ball or other bearings 127. One pendulum is supported by another in order to overcome the deleterious effects of an oscillating pendulum. These weights and pendulum lengths are so selected that their natural oscillatory periods are not multiples of each other and they therefore counteract each other's tendency to oscillate. The shaft 126 is rigidly attached to the arm 128 which carries spring plungers 129. The spring plungers hold between them the arm 130 pinioned at the point 131 and supported on the arm 128. The spring plungers are so designed that each stops at dead center or, in other words, moves only away from center. The arm 130 carries compensating weight 132 at its upper end and contact point 133 at its lower end. On a lateral stabilizing unit this type of compensator compensates for centrifugal action when the airplane turns. On the longitudinal stabilizing unit it compensates for acceleration and deceleration. The arm 134 is swiveled from a point 135 concentric with the shaft 126. It carries near its lower end a contact point 136. Its lower end is adjustably connected at 137 to the rod 138 which is driven by the arm 119 as in Fig. 12. A battery circuit between the points 133 and 136 actuates a relay 139 in such manner that when the circuit is broken contact is made at 140; when the circuit is established contact is broken at 140 and made at 141. 84 and 85 diagrammatically illustrate a pair of magnetic clutches such as those illustrated by the same numbers in Fig. 12. This single contact arrangement causes a continuous vibration which works in the following manner. Contact is made between 133 and 136. Current energizes clutch 84 rotating the bridge 71 until the arm 119 pushes the rod 138 until it breaks the current between 133 and 136. When the current is broken contact is made at 140 which energizes the clutch 85 which reverses the movement of the table 71. Thus the stabilizer unit as illustrated in Fig. 14 tends to hunt a theoretical point and is not working thru a blank arc as is the case with a double contact system. The slight oscillatory movement of the bridge 71 tends to make the whole mechanism hunt an accurate mean center since it will oscillate much faster than it is possible for the ailerons to oscillate the craft.

In similar manner the longitudinal stabilizer unit at 118 constantly but slightly rocks the arm 81 hunting an oscillatory center. A double contact system may be used if desired, wherein the smallest blank arc that is practicable is used.

Fig. 15 illustrates a manual control device. To the handle 122 is connected a brush 142 which contacts with a conducting segment 143 located on a rotatable disc 144. The disc is rotated by any suitable means such as Bowden wire 121 and the contact points are led to mechanism similar to that in Fig. 14 or two segments similar to 143 may be used with an insulated spot or blank arc between them sufficient for the normal positioning of the brush 142. In this manner it is possible to move the handle 122 a desired number of degrees and have the worm 86 move the table 73 exactly a proportionate distance breaking its own circuit by means of 121 at the corresponding point. This mechanism as illustrated in Fig. 15 is for total incidence control. Similar devices may be supplied for actuating by hand longitudinal and lateral stabilizing functions in case stabilizers fail or for any other reason it is desirable to use a hand control.

In Fig. 20 at 145 and 146 small worm and sprocket rotate flexible shaft or actuate other mechanism which moves arm as at 119 for furnishing follow-up function on stabilizer units or manual control devices where same are not located on the movable table 73.

Figure 10:
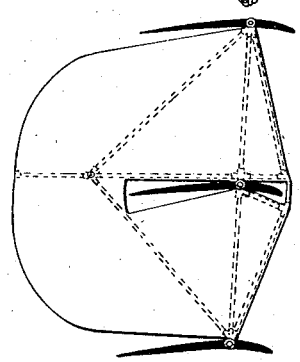
Fig. 10 is a metallic tubular strut and rudder combined, applied to my single wing spar structure and permitting of a change of incidence.
Figure 7:
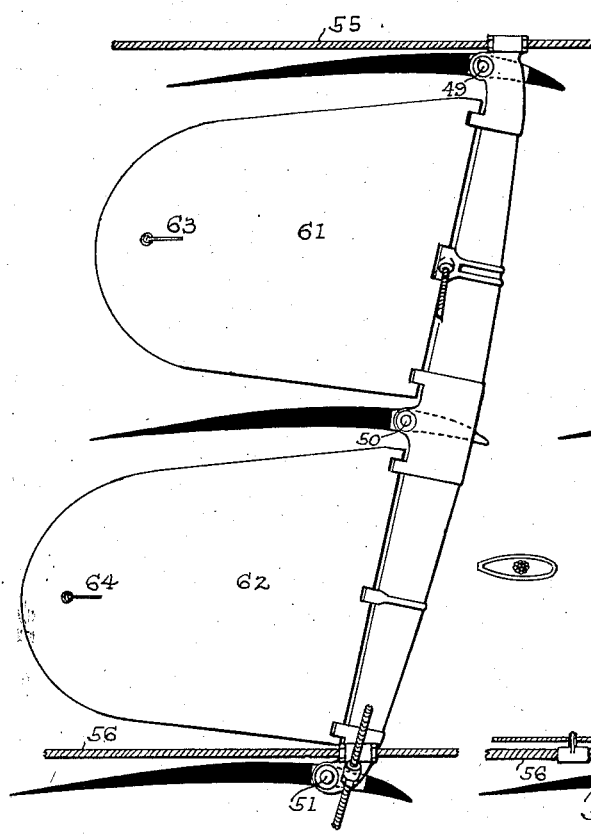
Figure 6:
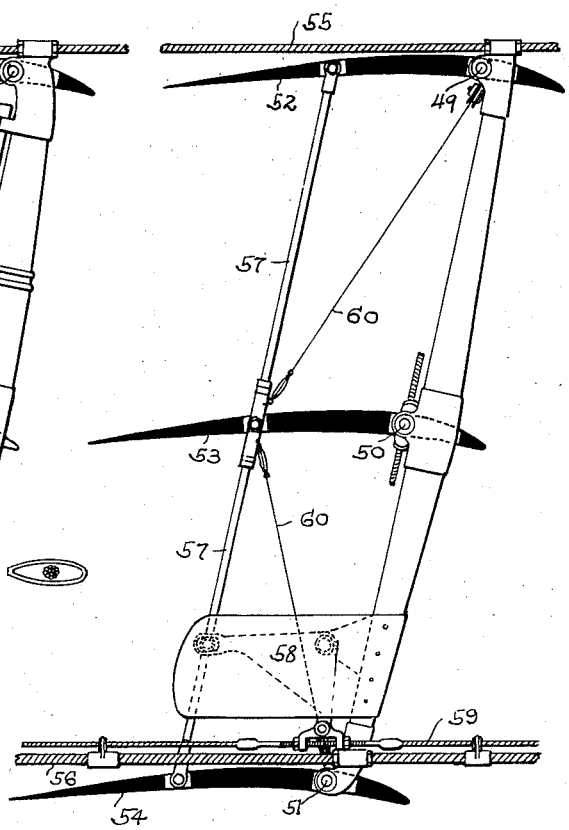

The steering rudders shown in Fig. 7, Fig. 9 and Fig. 10 are located in any desired number in similar manner and number on both sides of the longitudinal axis of the craft on the front and rear set of planes or the two front sets and two rear sets of planes. The interplane rudders on the forward planes and those on the rear planes are moved proportionately and inversely by a central control drum or device or they also may be actuated by a local prime mover as at 95 in Fig. 17, which in turn may be operated by a follow-up valve controlled from a steering mechanism in the pilot house by mechanical, electrical or other means.

The foregoing is a very general statement of a few of the principles involved in my invention. These are, of course, susceptible of endless variation in structural detail in the hands of those accomplished in these arts.

I claim—

1. In an aeroplane, a series of tandem aerofoils substantially all having movable ailerons on both sides of the aeroplane forming rear end portions thereof, and a pendulum-operated automatic stabilizer having connections to all ailerons, said stabilizer having means whereby all ailerons on one side of the aeroplane may be deflected inversely with those of the other side, and at the same time ailerons on forward aerofoil or aerofoils may be deflected inversely with those on the rear aerofoil or aerofoils by means of a differential movement.

2. In an aeroplane as claimed in claim 1, two fuselages mounted parallel to each other.

3. In an aeroplane, a series of tandem aerofoils having angles of incidence progressively increasing from forward to rear, but the increase in such angle of the rearward aerofoils being progressively less.

4. In an aeroplane, a series of tandem aerofoils substantially all having pivoted ailerons, a pendulum-operated automatic stabilizer and means for effecting therefrom opposite angular changes in position of ailerons located respectively on forward, and on rear aerofoils.

5. In an aeroplane, a series of tandem aerofoils substantially all having pivoted ailerons on both sides of the aeroplane, and a pendulum-operated automatic stabilizer having multiple connections respectively to ailerons on the same side of the aeroplane, and independent connections to ailerons on the other side thereof.

6. In an aeroplane, a series of tandem aerofoils substantially all having pivoted ailerons on both sides of the aeroplane, and a pendulum-operated automatic stabilizer having multiple connections respectively to ailerons on the same side of the aeroplane, and means whereby the forward and rear ailerons on the same side of the aeroplane may be deflected in an opposite manner.

7. In an aeroplane, a series of tandem aerofoils substantially all having pivoted ailerons on both sides of the aeroplane, and a pendulum-operated automatic stabilizer having multiple connections to ailerons on the same side of the aeroplane, said stabilizer having means whereby all ailerons may be similarly deflected, and forward and rear ailerons, or ailerons on the two sides of the machine, deflected in an opposite manner.

8. In an aeroplane, a series of tandem aerofoils substantially all having pivoted ailerons on both sides of the aeroplane, and a differential pendulum-operated automatic stabilizer having multiple connections to ailerons on the same side of the aeroplane, said stabilizer having means whereby all ailerons may be similarly deflected, or ailerons on the two sides of the machine deflected in an opposite manner.

9. In an aeroplane as claimed in claim 1, the additional structure comprising an automatic stabilizer.

10. In an aeroplane as claimed in claim 2, the improvement comprising a stabilizer which is pneumatically operated.

In testimony that I claim the foregoing I have hereunto set my hand.

WARD LEATHERS.

Witnesses:
 JOSEPH GRIES,
 HARRY J. FLEMMING.